United States Patent
van Leeuwen

(10) Patent No.: US 6,484,871 B2
(45) Date of Patent: Nov. 26, 2002

(54) SEGMENTED BELT TURN CONVEYOR BELT

(75) Inventor: Thomas A. van Leeuwen, Mississauga (CA)

(73) Assignee: Rapistan Systems Advertising Corp., Grand Rapids, MN (US)

( * ) Notice: Subject to any disclaimer, the term of this patent is extended or adjusted under 35 U.S.C. 154(b) by 32 days.

(21) Appl. No.: 09/838,838

(22) Filed: Apr. 20, 2001

(65) Prior Publication Data

US 2002/0005337 A1 Jan. 17, 2002

Related U.S. Application Data

(60) Provisional application No. 60/200,662, filed on Apr. 28, 2000.

(51) Int. Cl.⁷ .............................................. B65G 15/02
(52) U.S. Cl. ..................................................... 198/831
(58) Field of Search ................................ 198/831, 846, 198/847

(56) References Cited

U.S. PATENT DOCUMENTS

| | | | | |
|---|---|---|---|---|
| 2,413,339 A | * | 12/1946 | Stadelman | 198/831 |
| 3,100,565 A | * | 8/1963 | Fry | 198/831 X |
| 3,189,161 A | | 6/1965 | Schneider et al. | 198/127 |
| 3,237,754 A | | 3/1966 | Freitag, Jr. et al. | 198/182 |
| 4,185,737 A | | 1/1980 | Blättermann | 198/831 |
| 4,427,107 A | | 1/1984 | Roberts et al. | 198/844 |
| 5,275,858 A | | 1/1994 | Hock | 428/58 |
| 5,332,082 A | | 7/1994 | Sommerfield | 198/831 |
| 5,667,058 A | * | 9/1997 | Bonnet | 198/831 |
| 5,722,531 A | | 3/1998 | Zimny et al. | 198/831 |
| 5,857,559 A | | 1/1999 | Gianviot et al. | 198/831 |
| 5,860,512 A | | 1/1999 | Gianvito et al. | 198/841 |

FOREIGN PATENT DOCUMENTS

| | | | | |
|---|---|---|---|---|
| NL | 7706431 | 6/1977 | | B65G/15/02 |

OTHER PUBLICATIONS

Patent Cooperation Treaty Search Report for Application No. PCT/EP01/04626 which is based on corresponding U.S. patent application Ser. No. 09/838,838, filed on Apr. 20, 2001.

* cited by examiner

Primary Examiner—James R. Bidwell
(74) Attorney, Agent, or Firm—Van Dyke, Gardner, Linn & Burkhart, LLP

(57) ABSTRACT

A belt assembly for a belt turn conveyor includes a belt with a plurality of longitudinal fibers generally aligned or oriented along the curved longitudinal axis of the belt. The belt may comprise a plurality of belt segments which are interconnected to form an endless belt, with each belt segment preferably including a plurality of longitudinal fibers aligned along the longitudinal axis of each respective belt segment. When interconnected, the longitudinal fibers of each belt segment generally align along the curved longitudinal axis of the belt. Alternately, the belt may be woven such that the longitudinal fibers are substantially aligned along the curved longitudinal axis of the curved belt. Thus, a belt assembly for a belt turn conveyor is provided that exhibits a more uniform stiffness along its length, which results in the belt assembly exhibiting reduced forces across its length thus increasing the belt's capacity and longevity.

36 Claims, 10 Drawing Sheets

SEGMENTED BELT TURN CONVEYOR BELT

This application claims priority from U.S. Pat. provisional application Ser. No. 60/200,662, filed Apr. 28, 2000, which is incorporated by reference herein in its entirety.

TECHNICAL FIELD AND BACKGROUND OF THE INVENTION

The present invention generally relates to a transporting apparatus and, more particularly, to a belt for belt turn conveyors.

Belt turn conveyors are used to provide turns, for example turns of 30°, 45°, 60°, 90°, and 180°, in a conveyor system. The belt turn conveyors are positioned between and interconnect the flow of generally straight conveyor sections to form a bend or curve in the conveyor system. A conventional belt turn conveyor typically includes a frame which supports a pair of conical shaped pulleys positioned at each end of the frame and a continuous belt which extends over and between the pulleys. In order to provide uniform contact with the rollers across the width of the belt, the belt has a smaller length at its inner radius and a longer length towards its outer radius.

The belt material forming both straight run belts and belts for curved conveyors is usually formed from a plurality of longitudinal and transverse fibers which extend through the belt material. Belts used on straight runs usually have strands or fibers running along the length of the belt and strands or fibers running transversely across the belt to provide strength to the belt. In this manner, the fibers are oriented along the direction of tension to minimize stretching. However, when belts are fabricated for belt turn conveyors, the belt material is cut from a piece of straight conveyor material (B) in the shape of the curve (see FIG. 10). For example, for a 90° turn, the belt material is cut in a semi-circular annular section and folded over to form a 90° closed loop. Thus, the orientation of the fibers remain generally parallel throughout the cross-section of the semi-circular shaped belt, but provide no uniformity along the curved longitudinal belt axis or, in other words, in the direction of pull or tension.

It has been found that belts for belt turn conveyors require relatively frequent replacement. Furthermore, it has been found that the wear along the belt is non-uniform. Stresses imposed on the belt by the radial forces generated at the curve tend to accelerate the wear of the belt material as compared to the wear of belts on straight run conveyors. As a result, the turn conveyor belt can become the weak link in a conveyor system.

Consequently, there is a need for an improved belt for belt turn conveyors that exhibits improved performance and longevity and, further, exhibits an increased capacity.

SUMMARY OF THE INVENTION

According to the present invention, a belt turn conveyor includes a continuous belt which exhibits improved longevity and/or increased capacity. The endless belt has a generally uniform stiffness along its length and width such that the forces associated with retaining the belt on the frame are more evenly distributed along the belt's length.

In one form of the invention, a belt turn conveyor includes a frame and an endless belt which is rotationally supported by the frame. The endless belt is restrained in the frame to limit vertical and lateral movement of the belt with respect to the frame. The endless belt has a curved longitudinal axis and a plurality of fibers aligned along the curved longitudinal axis to provide directional strength to the belt in the tension direction. In this manner, the fibers of the endless belt are generally oriented to follow the curved path of the belt turn conveyor whereby the endless belt exhibits substantially uniform stiffness over its length and exhibits substantially reduced variations in forces where the belt is restrained on the frame.

In one aspect, the outer perimeter of the belt is restrained by the frame. For example, the outer perimeter of the belt may include at least one bearing assembly for engaging the frame to substantially retain the belt on the frame. Preferably, the outer perimeter of the belt includes a plurality of bearing assemblies, such as wheel assemblies, which engage the frame.

In another form of the invention, the endless belt comprises a plurality of interconnected belt segments. Each of the belt segments is interconnected to an abutting belt segment by either lacing or finger splicing, preferably by vulcanized finger splicing. For example, each belt segment may comprise a segment having an angle in a range of about a 5° to 75° per segment.

According to another form of the invention, a belt turn conveyor includes a frame with at least one bearing surface and an endless belt rotationally supported by the frame which extends along a curved path of the frame, with the endless belt having an inner perimeter and an outer perimeter. A plurality of bearing assemblies are secured to the outer perimeter of the endless belt, which engage the bearing surface of the frame for restraining movement of the endless belt on the frame. The endless belt has a curved longitudinal axis and a plurality of fibers generally aligned along the curved longitudinal axis to provide directional strength to the belt along the direction of tension whereby the endless belt exhibits substantially uniform stiffness over its length and exhibits substantially reduced variations in forces at its bearing assemblies.

In one aspect, the endless belt comprises a plurality of interconnected belt segments. In a further aspect, the interconnected segments are joined along an axis offset from a radial axis of the belt turn conveyor to thereby reduce the noise generated by the belt.

In other aspects, each of the segments includes a longitudinal axis and fibers generally aligned along the longitudinal axis, with the fibers of each segment generally aligned to follow the curved path of the frame. In further aspects, the fibers of each respective segment are aligned generally parallel to a tangent of a portion of the curved path corresponding to the respective segment.

In another form of the invention, an endless belt assembly for a belt turn conveyor includes an endless belt and at least one bearing assembly secured to the endless belt for engaging a bearing surface of a frame of a belt turn conveyor to retain the endless belt in the frame. The endless belt has a curved longitudinal axis coincident with the curved path of the belt turn conveyor and, further, includes a plurality of fibers generally aligned along the curved longitudinal axis of the endless belt whereby the endless belt exhibits substantially uniform stiffness over its longitudinal axis and exhibits substantially reduced forces at its outer perimeter thereby increasing the capacity of the endless belt or the longevity of the belt or both.

In one aspect, the bearing assembly comprises a plurality of bearing assemblies, for example, wheel assemblies. In another aspect, the endless belt comprises a plurality of interconnected belt segments. Preferably, each of the belt segments includes a longitudinal axis, and has a plurality of fibers which are aligned along the longitudinal axis of each belt segment. Each belt segment is interconnected with an abutting belt segment such that the fibers of each of the belt segments generally align along the curved longitudinal axis of the endless belt. In this manner, the belt of the present invention provides a curved belt which exhibits a more uniform stiffness along its length and, as a result, exhibits an increased capacity and/or longevity.

These and other objects, features, and advantages will become more apparent from a study of the drawings taken in conjunction with a review of the description which follows.

DETAILED DESCRIPTION OF THE PREFERRED EMBODIMENTS

Figure 1:
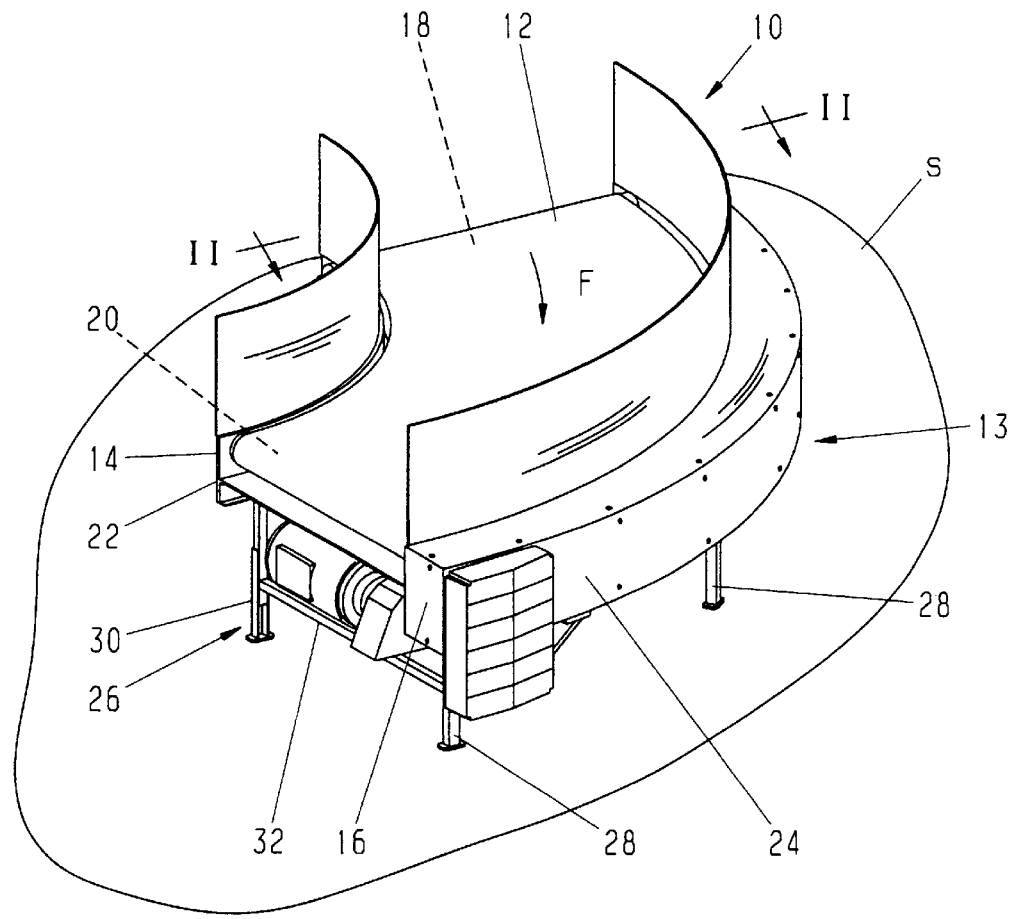
FIG. 1 is a perspective view of a belt turn conveyor assembly incorporating the belt of the present invention.

Referring to FIG. 1, the numeral 10 generally designates a belt turn conveyor incorporating an endless belt 12 of the present invention. Belt 12 comprises a closed loop belt which is assembled or formed, as will be described in greater detail below, in such a manner to exhibit a more uniform stiffness along its curved length and across its transverse direction or width so that the forces to maintain the belt in and on the belt turn conveyor are more evenly distributed along its length thereby reducing the stresses in the belt, and thus exhibiting significantly increased durability and longevity. As a result, belt 12 exhibits significantly improved performance whether by way of increasing its load capacity or by way of lengthening the life of the belt. To achieve this increased longevity and/or capacity, the fibers comprising belt 12 are generally aligned or oriented along the length and across the lateral extent of belt 12 in a manner that results in a more homogeneous belt with a more uniform stiffness, as will be more fully described below.

Figure 2:
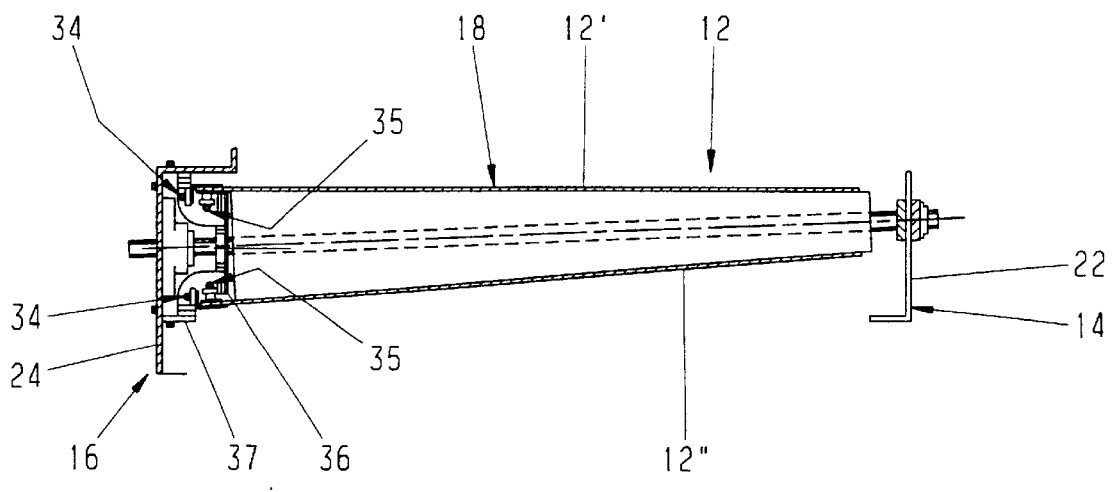
FIG. 2 is a cross-section view taken along line II—II of FIG. 1.

As best seen in FIGS. 1 and 2, belt turn conveyor 10 includes a frame 13 with a pair of opposed inner and outer side rails 14 and 16, which respectively define the inner radius and outer radius of the belt turn conveyor 10. Mounted between inner rail 14 and outer rail 16 are a pair of conical shaped rollers 18 and 20 which are respectively journaled in the vertical webs 22 and 24 of inner and outer rails 14 and 16. Belt 12 is a continuous belt which extends over rollers 18 and 20 to define upper and lower paths 12' and 12" (FIG. 2) forming a curved flow path, for example, a curved flow path F as indicated by the arrow in FIG. 1. In the illustrated embodiment, belt turn conveyor 10 comprises 90° belt turn conveyor; however, it can be appreciated that belt turn conveyor 10 may comprise other angled belt turn conveyors, including for example 30°, 45°, 60°, 135°, or 180° belt turn conveyors.

Inner and outer rails 14 and 16 are supported above a support surface S, such as a floor of a factory or warehouse, by a plurality of supports or frame members 26 which are spaced along the length of conveyor 10 to provide uniform support to inner and outer rails 14 and 16. Each frame member 26 includes a pair of upstanding legs 28 and 30 which are respectively connect to inner and outer rails 14, 16, such as by welding or bolting as would be understood by those skilled in the art. Legs 28 and 30 are preferably interconnected by a brace member 32 which provides stiffness to the respective legs 28, 30 and, in turn, to side rails 14 and 16.

Referring to FIG. 2, in order to retain endless belt 12 in the curved path of the belt turn conveyor 10, belt 12 includes a plurality of bearing assemblies 34, 35, such as rollers or wheels, which are mounted to the belt's outer peripheral portion. Bearing assemblies 34, 35 engage bearing surfaces, for example generally vertical bearing surfaces 36 and generally horizontal bearing surface 37, respectively, provided by outer rail 16. Bearing assemblies 34 and 35 are preferably secured to the proximate edge portion of belt by fasteners and/or brackets. Reference is made to U.S. Pat. Nos. 5,857,559; 5,860,512; and 5,722,531, for examples of suitable bearing assemblies and mounting arrangements, all commonly assigned to Mannesmann Dematic Rapistan Corporation of Grand Rapids, Mich., the disclosures of which are herein incorporated by reference in their entireties. Alternately, belt 12 may be retained in its curved path by other bearing assemblies, for example by a strip of low friction material or a plurality of low friction pads, such as described in U.S. Pat. No. 5,860,512.

Figure 3:
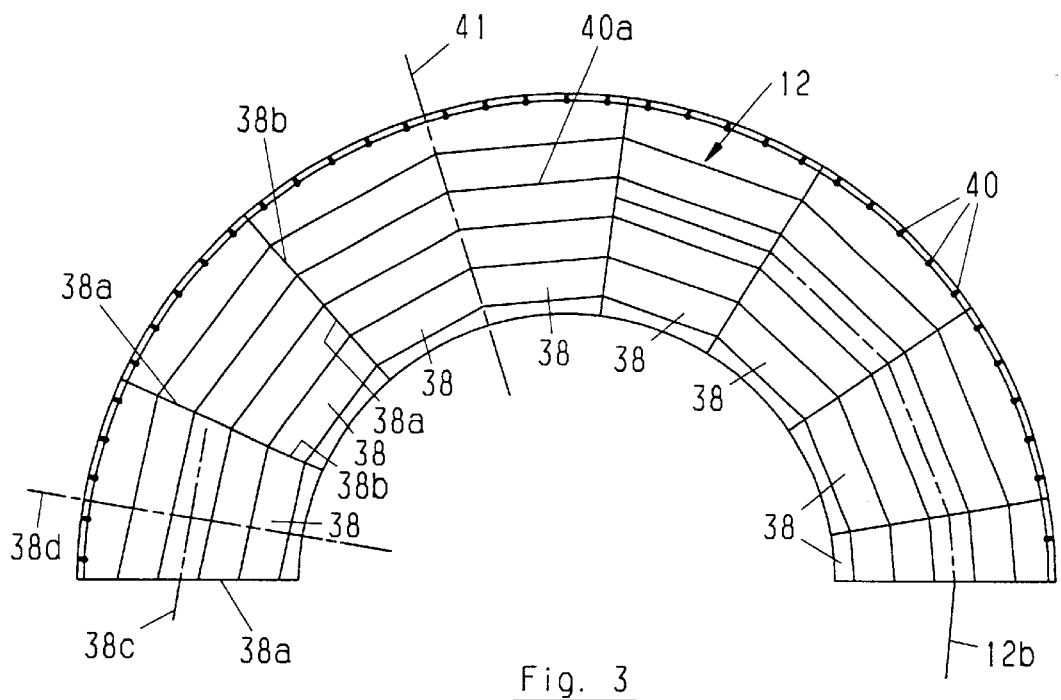
FIG. 3 is a plan view of the belt of FIG. 1.

Referring to FIG. 3, belt 12 comprises a segmented continuous belt having a plurality of belt segments 38 which are interconnected at their free edge portions 38a and 38b by splices, including vulcanized finger splices, lacing, or the like. When connected, segments 38 form a closed loop with a curved longitudinal extent. In preferred form, segments 38 comprise segments in a range of 5° to 75°, more preferably, 5° to 35° and, most preferably 25° to 30°. In addition, in the illustrated embodiment, edge portions 38a and 38b are aligned along radial axes 41 of belt turn conveyor 10. As will be more fully explained, by aligning the edges of each segment along axes 41, the respective longitudinal fibers forming each belt segment are generally aligned with the longitudinal fibers of abutting segments and, further, the longitudinal fibers are generally parallel to the tangent of the curve at the center of that particular segment. One advantage of the segmented belt is that a single section of the belt may be replaced rather than the entire belt length.

Figure 4:
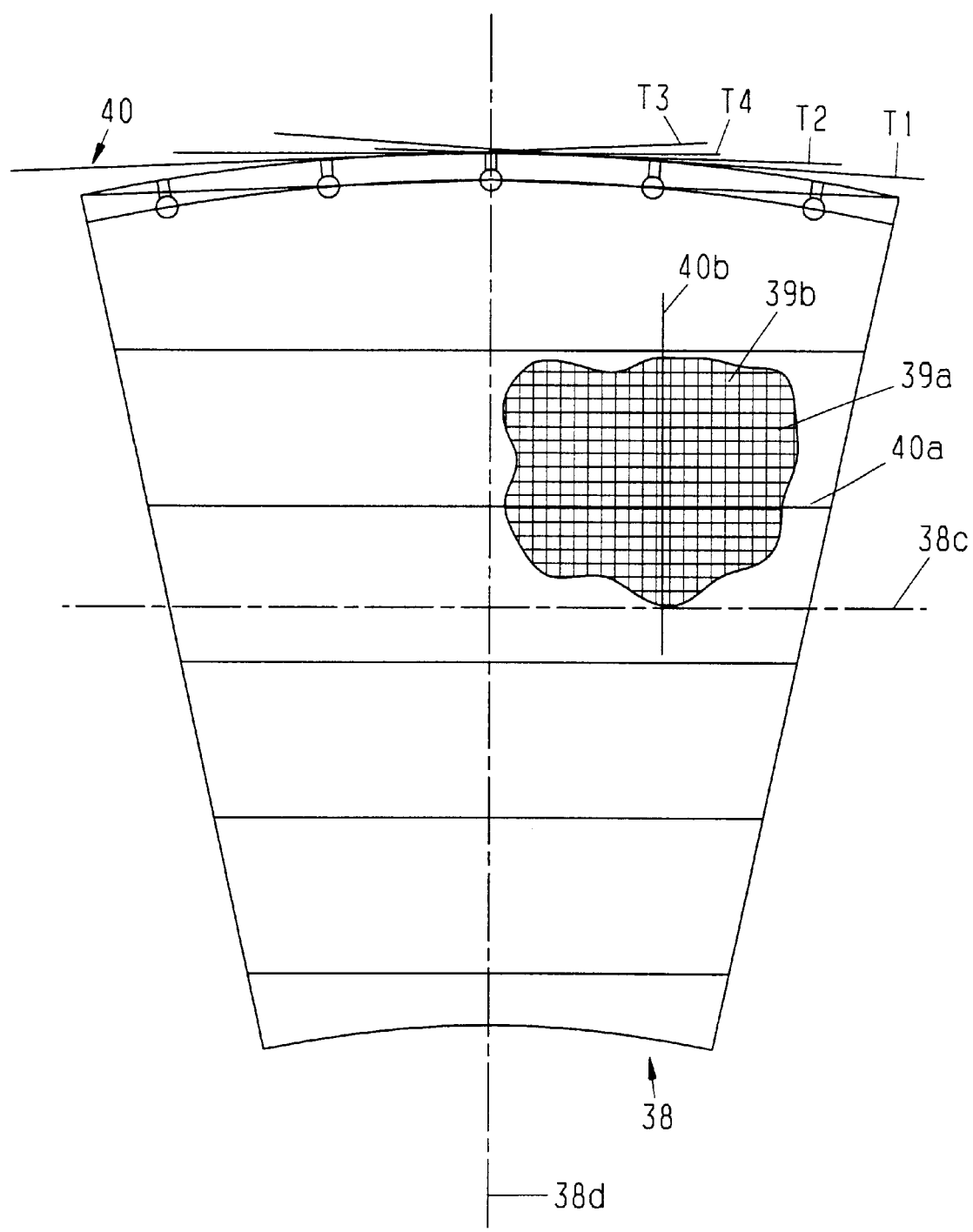
FIG. 4 is an enlarged plan view of one segment of the belt of FIG. 3.
Figure 11:
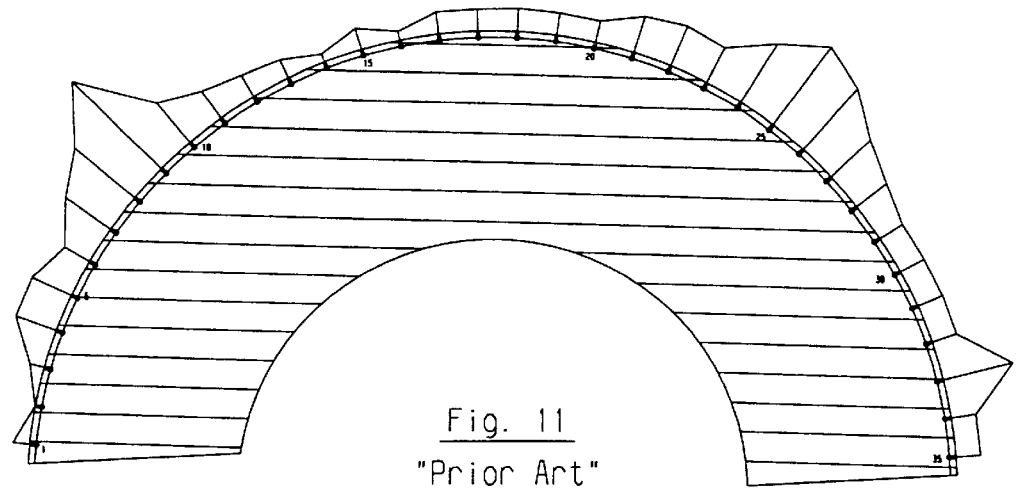
FIG. 11 is a similar view of FIG. 10 illustrating the forces as measured at the bearing assemblies provided at the outer perimeter of the belt of FIG. 10.
Figure 9:
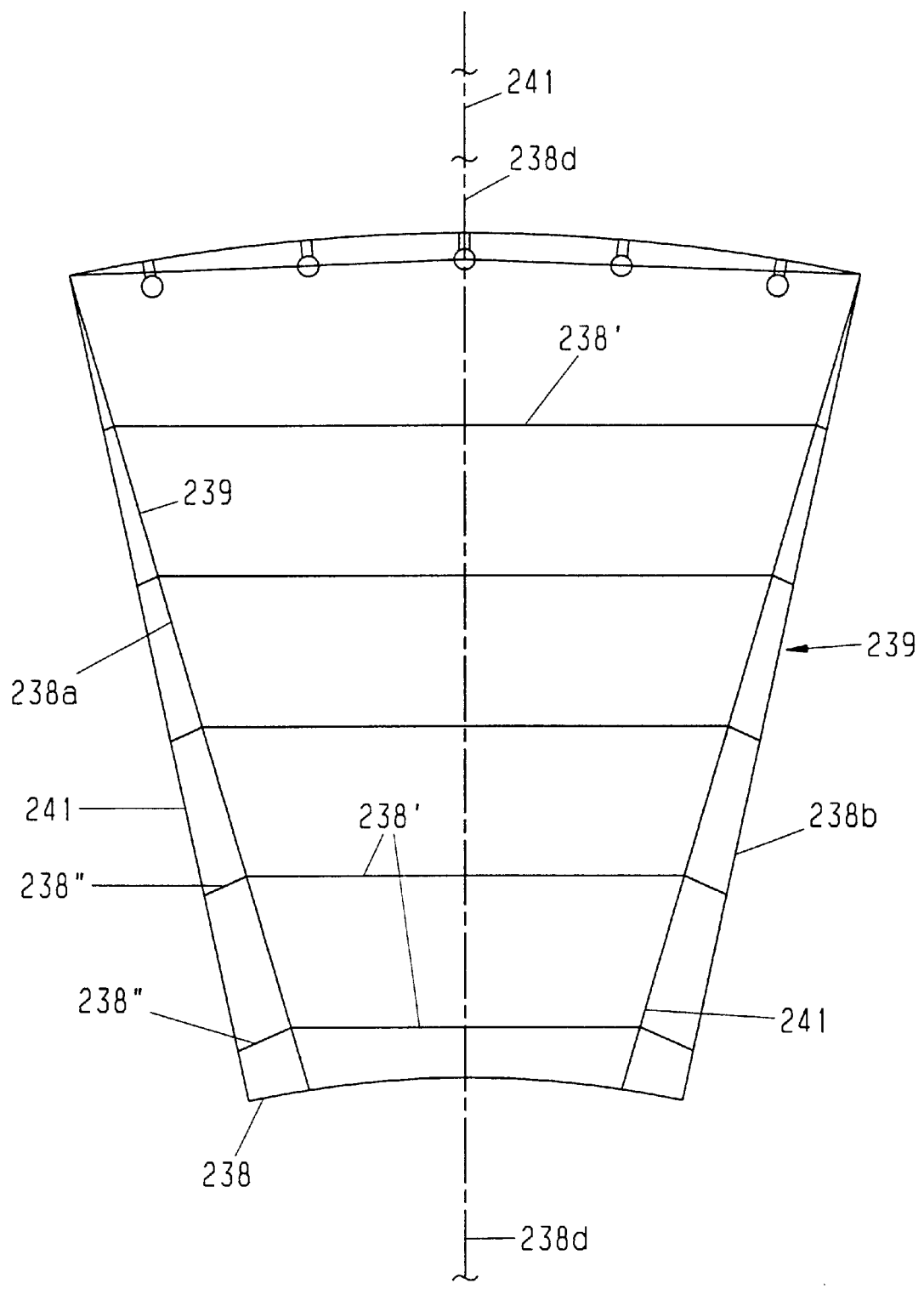
FIG. 9 is a similar view to FIG. 4 illustrating an enlarged segment of the belt of FIG. 8.

Each belt segment 38 is constructed from a conventional belt material which typically has high directional strength properties along its longitudinal axis 38c and along its transverse axis 38d (FIGS. 3 and 4). As best seen in FIG. 4, each segment 38 includes a plurality of longitudinal strands or fibers 39a, as generally represented by line 40a, which run generally parallel to center longitudinal axis 38c of segment 38, and a plurality of transverse strands or fibers 39b, as generally represented by line 40b, which generally run parallel to center radial axis 38d. In this manner, strands 39a are generally orthogonal to strands 39b. Furthermore, belt 12 is segmented such that the fibers 39a of each segment 38 are generally aligned parallel with the tangent lines T1, T2, T3 to the curve of the belt turn conveyor and are substantially parallel with the tangent line T4 passing through the axis 38d. By aligning the longitudinal fibers 39a of each segment 38 with the longitudinal fibers 39a of each adjoining segment and aligning fibers 39b along radial axis 41, belt 12 exhibits more uniform properties, such as stiffness, along its length. In addition, by aligning the longitudinal fibers 39a with the tangents to the curve and longitudinal axis 38c, the longitudinal fibers are aligned along the direction of pull or tension, and belt 12 is more resistant to stretching. As a result, the forces associated with moving the belt across the belt turn conveyor and restraining the belt from lifting off or moving with respect to the conveyor, especially when loaded with objects to be transported by conveyor 10, are more evenly distributed along the belt's outer perimeter such that the maximum forces (see FIG. 5) at the bearing assemblies 34, 35 (FIG. 2) are significantly reduced as compared to the forces normally associated with a conventional belt (as seen in FIG. 11).

Figure 5:
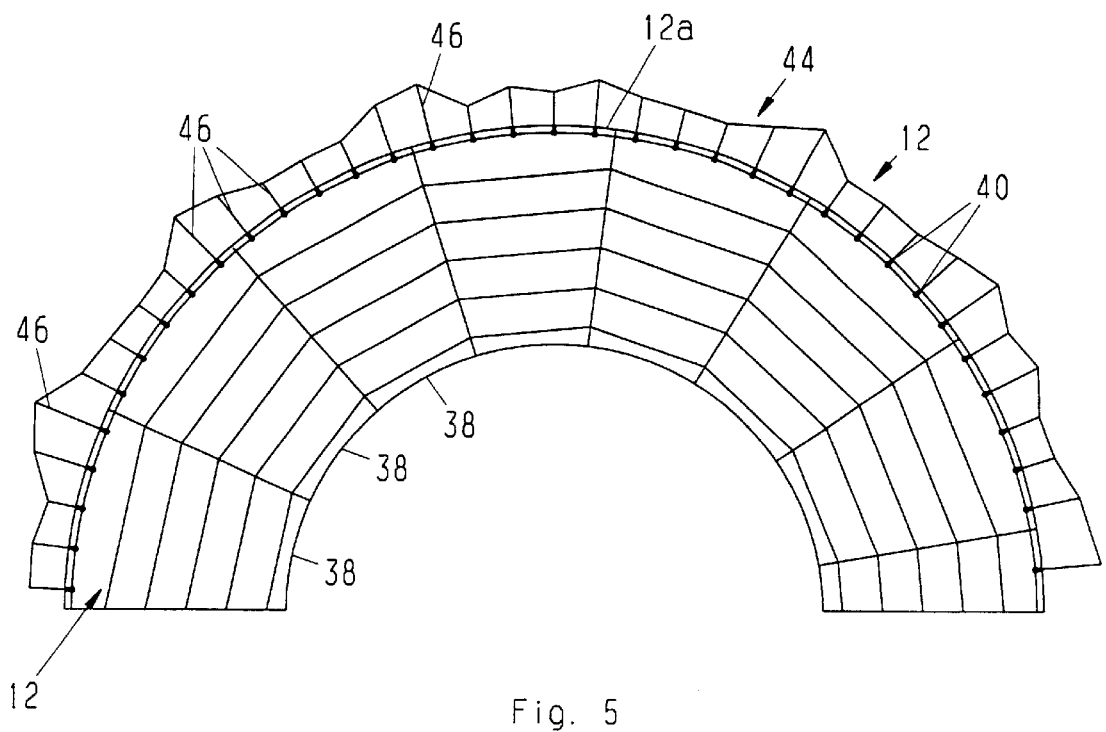
FIG. 5 is a similar view to FIG. 3 illustrating the forces as measured at the respective bearing assemblies provided at the outer perimeter of the belt.

Referring to FIGS. 2–5, the bearing forces at each respective bearing assembly 34, 35, which are represented in FIGS. 3–5 generally by a single point 40, are measured and plotted on as a graph 44 (FIG. 5). While the bearing forces 46 at each respective bearing assembly location 40 still varies along the outer perimeter 12a (FIG. 5) of belt 12, belt forces 46 are more uniformly distributed along the length of belt 12 and, further, are distributed in a manner such that the maximum magnitude of the forces is significantly smaller than in the prior art belt. As a result, belt 12 has been found to exhibit significantly improved longevity. Though the minimum magnitude of the forces has increased as compared to the prior art belt, the maximum force magnitude is significantly lower than the maximum force magnitude of the prior art belt assemblies. For example, the maximum bearing assembly force for belt 12 is about 45% of the maximum force of a conventional belt. It can be appreciated, by aligning the longitudinal multi-filament fibers of the belt generally tangent to the curve of the belt turn conveyor and the transverse fibers along the radii of the belt turn conveyor, the stiffness of each respective segment 38 is substantially similar to the adjacent segments and thus the overall stiffness of belt 12 is more uniform along its curved length. Furthermore, it has been found that the tension on belt 12 may be increased so that belt 12 can pull a larger load with less belt wear.

Figure 6:
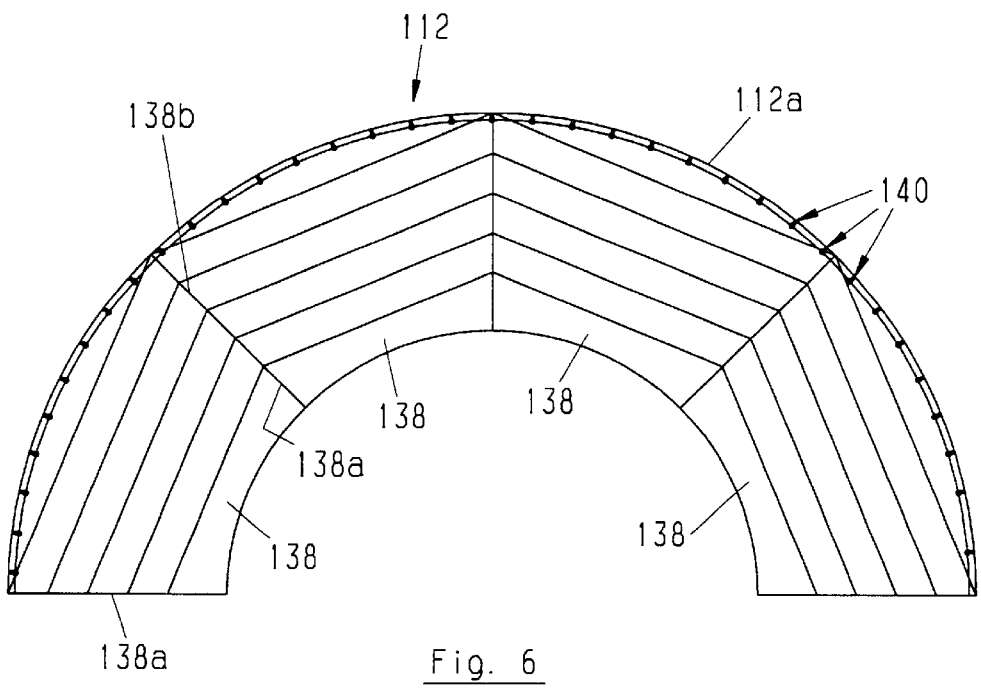
FIG. 6 is a similar view to FIG. 3 illustrating a second embodiment of the belt of the present invention.

Referring to FIG. 6, a second embodiment 112 of the belt of the present invention is illustrated. Belt 112 comprises a closed loop belt similar to belt 12 and includes a plurality of segments 138 which are interconnected at their free-edge portions 138a and 138b to adjacent segments to form a continuous loop. Segments 138 may be joined by splicing, such as vulcanized finger splicing, lacing or the like. Positioned at the belt's outer perimeter 112a are a plurality of bearing assemblies, represented by the location points labeled 140. The bearing assemblies retain belt 112 on frame 13, in a similar manner to the previous embodiment. For further details of the bearing assemblies, reference is made to belt 12.

In the illustrated embodiment, segments 138 comprise segments in a range of 45° to 52° segments with each segment having longitudinal fibers generally aligned along the curved longitudinal axis of the belt and transverse fibers aligned along the radial axes of the belt turn conveyor, similar to the previous embodiment.

Figure 7:
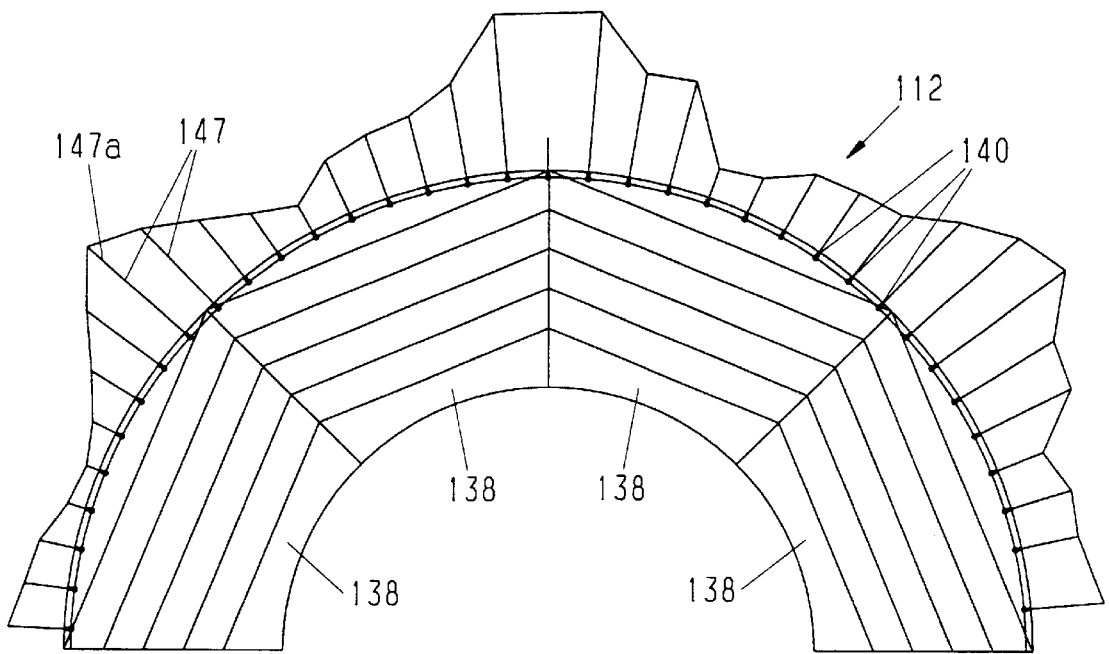
FIG. 7 is a similar view to FIG. 6 illustrating the forces as measured at the bearing assemblies provided at the outer perimeter of the belt of FIG. 6.

As best seen in FIG. 7, belt 112 exhibits reduced forces 147 at each bearing assembly location 140, with a maximum force of approximately 75% of the maximum force on a conventional belt turn conveyor belt. Though belt 112 does not exhibit the same degree of reduction in forces as belt 12, belt 112 still provides increased longevity and/or increased load capacity.

Figure 8:
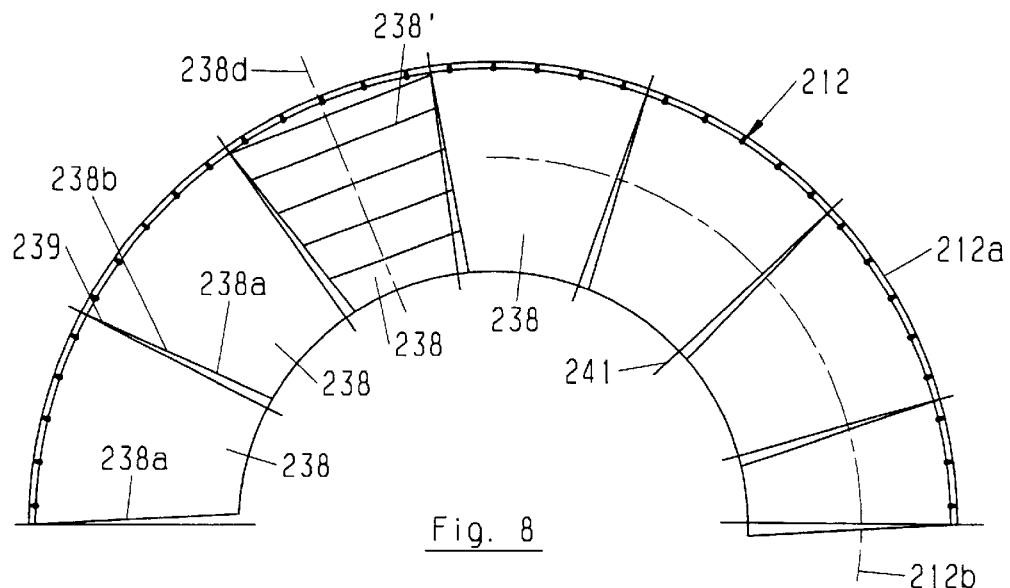
FIG. 8 is a similar view to FIG. 3 illustrating a third embodiment of the belt assembly of the present invention.
Figure 10:
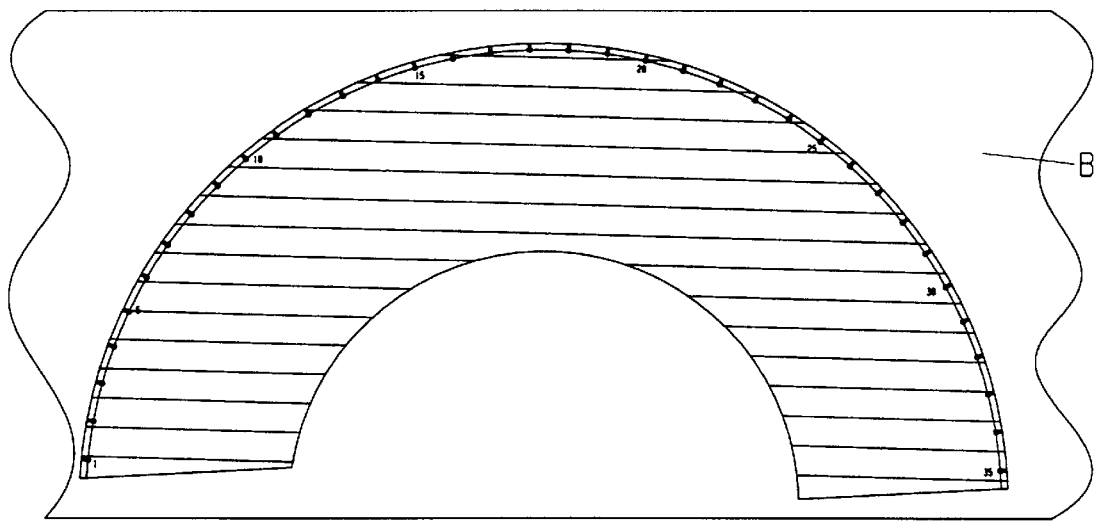
FIG. 10 is a plan view of a prior art belt turn conveyor belt.

Referring to FIG. 8, a third embodiment 212 of the belt of the present invention is illustrated. Belt 212 includes a plurality of segments 238 similar to belt 12, with each segment comprising a segment having an angle in a range of approximately 5° to 75° and, more preferably, in a range of about 5° to 35° and, more preferably in a range of 25° to 30°. Similar to belt 12, each segment 238 includes longitudinal fibers generally represented by lines 238' aligned along the longitudinal axis of each segment and preferably aligned generally parallel to the tangent lines running through the medial or center portion of the outer perimeter of the respective segment. Further, the transverse fibers are generally aligned along radiating axes 238d of each respective segment. Each segment 238 is connected to adjacent or abutting segments at their respective free-edge portions 238a and 238b similar to belt 12. However, joints 239 formed by the adjacent belt sections 238 are offset from belt turn radial axes 241. In this manner, joint 239 is at an angle or bias with respect to rollers 18 and 20 which results in reduced noise when belt 212 is running. In order to achieve the bias or angle, free-edge portions 238a and 238b are formed offset from the transverse or radial axis 238d of each segment 238 while transverse axis 238d of each segment remains aligned along radial axes 241 of the belt turn conveyor. Furthermore, while the longitudinal fibers of each segment 238 will be slightly offset from the longitudinal fibers 238" of adjacent segments, the longitudinal fibers still remain generally aligned along the curved longitudinal axis 212b of belt 212 similar to the previous embodiments.

Though the described embodiments referred to belts 12, 112, and 212 as being manufactured, prepared, or assembled as a segmented belt, belts 12, 112, 212 may be woven, as described below, such that their respective longitudinal fibers align and run generally parallel to the curved longitudinal axis of the belt with the transverse fibers being aligned generally orthogonal to the longitudinal fibers so that they extend along the radial axes of the curved path of the belt.

Typically, fabric is woven by passing a transverse yarn alternately above and below a series of longitudinal yarns. The longitudinal yarns are moved up and down so that they can make an opening for the transverse yarn to pass through. For example, odd longitudinal yarns (1, 3, 5 . . .) are held up while even longitudinal yarns (2, 4, 6 . . .) are moved down, then the transverse yarn is passed through the space between the yarns, for example, by a shuttle to make a first pass. After the shuttle has passed through the space between the odd and even longitudinal yarns, the even longitudinal yarns are moved up and the odd longitudinal yarns are moved down with the transverse yarn passed back through the space between the even and odd longitudinal yarns with the shuttle in an opposite direction from the first pass. After each pass of the shuttle through the space between the yarns, a beater pushes the transverse yarn against the already woven transverse yarns to make a tight weave. In order to weave a curved fabric for reinforcing a curved conveyor belt, the longitudinal yarns are preferably controlled so that each longitudinal yarn is raised and lowered independently so that different combinations of longitudinal yarns can be moved, such as by raising or lowering, to effectively control the space (shed) between the longitudinal yarns such that the transverse yarn migrates the fabric as will be more fully described below.

For example, if a curved fabric 400 of 1000 mm width is desired, and the fabric has one longitudinal yarn per millimeter.width, on the first travel of the shuttle, the even longitudinal fibers, namely 2, 4, 6 . . . 1000 are raised and the shuttle traverses the space between the raised longitudinal fibers and the remaining odd longitudinal fibers, namely 1, 3, 5 . . . 999. On the next pass, longitudinal fibers 1, 3, 5. . . 999 are raised and the shuttle is passed back through the space defined between the odd longitudinal fibers and the even longitudinal fibers. This is repeated for a next full return of the transverse yarn to provide two full length passes (402) of 1000 mm in length. After these two passes of the transverse yarn between the respective longitudinal fibers, the even longitudinal fibers 2, 4, 6 . . . 750 are raised and the shuttle travels through the space between the raised longitudinal fibers and the remaining fibers, which results in the transverse yarn extending only partially across the width of the fabric to form a shorter pass (404) of the transverse fibers, for example, 750 mm. On the return pass, odd longitudinal fibers 1, 3, 5 . . . 749 are raised and the shuttle travels back to the starting side of the fabric. This shorter pass is then followed by two full width passes, in other words, where the even fibers 2, 4, 6. . . 1000 are raised followed by odd longitudinal fibers 1, 3, 5 . . . 999 being raised. After the two full passes, there is another shorter pass (406) in which even longitudinal fibers 2, 4, 6 . . . 500 are raised followed by odd longitudinal fibers 1, 3, 5 . . . 499. As a result, the length of the transverse yarn in that pass is, for example, 500 mm. After the 500 mm return pass, four full passes of the transverse fibers are made. In other words, the even longitudinal fibers 2, 4, 6,. . . 1000 are raised with the shuttle passing through the space between the raised longitudinal fibers and the remaining longitudinal fibers. This is then followed by the odd longitudinal fibers 1, 3, 5 . . . 999 being raised with the shuttle returning back through the space between the raised fibers and the remaining fibers to provide a 1000 mm return pass, which is repeated three more times. After the four full return passes, a shorter return pass (408) is made by raising even longitudinal fibers 2, 4, 6 . . . 250, followed by odd longitudinal fibers 1, 3, 5 . . . 249 resulting in a return pass length of 250 mm. As a result, by varying the length of the transverse fibers across the width of the fabric, the fabric assumes a curved shape.

Figure 12:
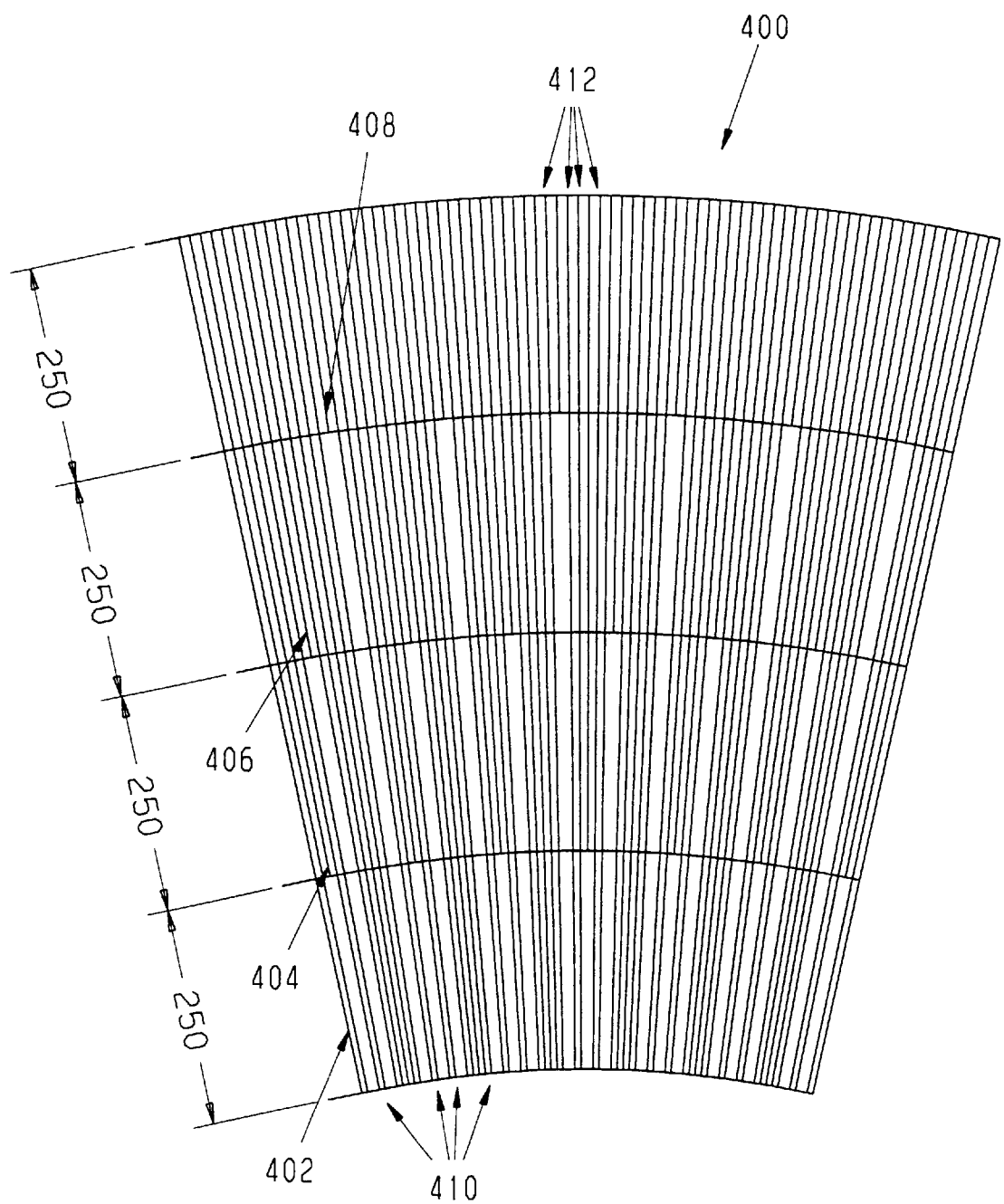
FIG. 12 is an enlarged plan view of a section of the fabric of a curved belt.

As best understood from FIG. 12, when the transverse fibers are pushed by, for example a beater, against the previously woven transverse yarn, the resulting fabric assumes a generally curved shape, with the full return ends (410) of the full length passes forming the inside radius of the curved material and the starting end (412) of the full length and shorter passes forming the outside radius of the curved material.

While a single example of a curved weaving pattern is illustrated, it should be understood that other patterns can be developed. Different patterns may be useful for different radii of curvature or different fabric widths, or in order to use fewer or more controlled lifting zones and, also, to achieve better fabric properties and/or appearance. Preferably, the woven pattern includes approximately the same number of transverse yarns per length at the inside of the curved piece of fabric as at the outside of the piece of fabric. It should be understood, that the number of controlled lifting zones for lifting selected longitudinal fibers may be increased; however, with an increased number of zones, the pattern may become more complicated and the fabric may have better (more even) weft yarn spacing. In preferred form, the weaving apparatus includes at least two zones.

Figure 13:
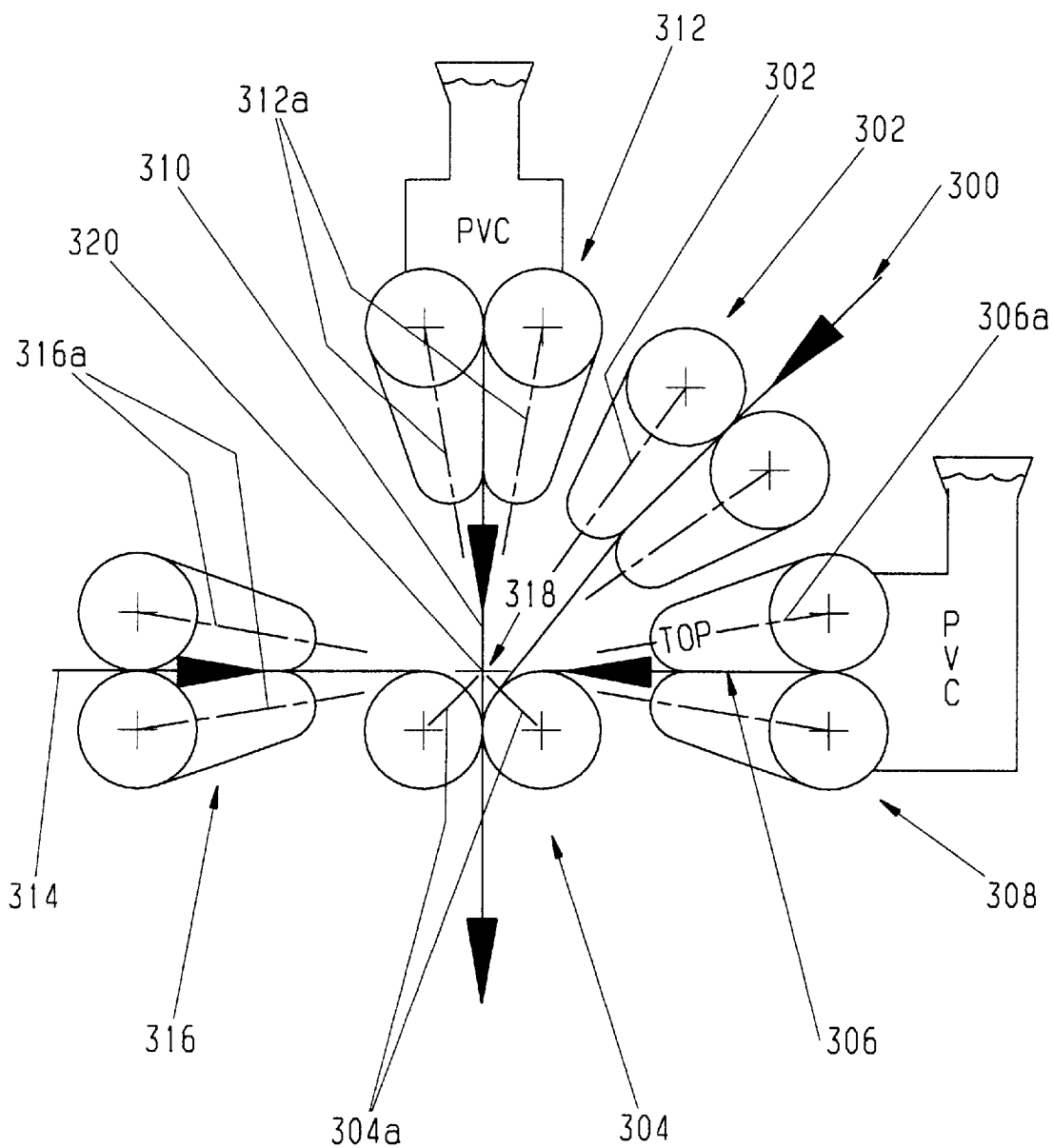
FIG. 13 is a schematic view of an apparatus for applying polymeric covers to a curved belt fabric.

After the fabric is woven, the next step in forming the belt material is to calender a polymeric cover above and below the fabric. Referring to FIG. 13, the curved fabric 300 is passed between a first set of rollers 302 and fed to a second set of rollers 304. A polymeric cover or layer 306 is passed between a third set of rollers 308 and directed to rollers 304 over material 300. A second polymeric cover or layer 310 is passed between a fourth set of rollers 312 and directed to rollers 304 below material 300. In addition, a second layer of fabric 314 is added beneath bottom polymeric cover 310 preferably in the same process. Fabric 314 is passed between a fifth set of rollers 316 which direct fabric 314 beneath polymer cover 310, and is fed into rollers 304. Preferably, the rollers provide a uniform thickness to the polymeric covers and the fabric. However, it should be understood that the polymeric covers and the additional fabric layer may be provided in several stages. After passing through rollers 308 and 312, covers 306 and 310 are pressed and preferably heated to glue the covers onto fabric 300 by rolling it through rollers 304. For the curved belt, conical or frustoconical rollers are used to roll the respective polymeric covers and fabric and, further, to press the polymeric covers onto the fabric.

Referring again to FIG. 13, in order to permit the material to run properly on the rollers, and therefore form the belt, rollers 302, 304, 308, 312, and 316 are aligned along longitudinal axes 302a, 304a, 308a, 312a, and 316a which intersect at one point 318 in space. Furthermore, lines drawn along the length of rollers' (302, 308, 312, and 316) surface and extended past point 318 would not miss point 318 by a distance greater than the thickness of the material being processed.

Figure 14:
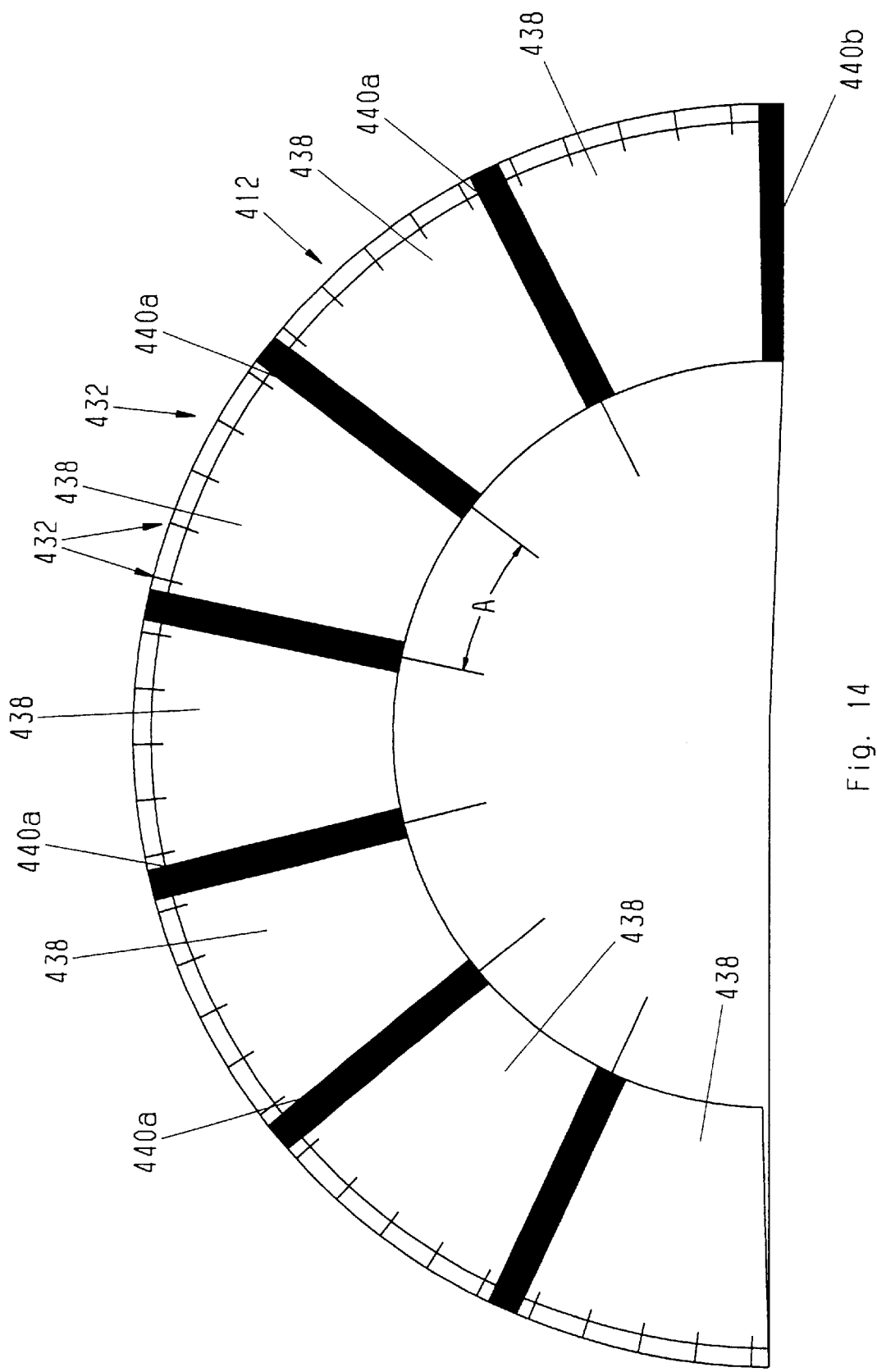
FIG. 14 is a plan view of another embodiment of the belt of the present invention.

Referring to FIG. 14, another embodiment 412 of the belt of the present invention is illustrated. Similar to the first three embodiments, belt 412 includes a plurality of belt segments 438, which are interconnected by vulcanized finger splices 440a and lacing clips 440b. Each segment 438 comprises a segment having an angle A in a range from approximately 5° to 75°, in a range from approximately 5° to 35°, or approximately 25°.

Figure 15:
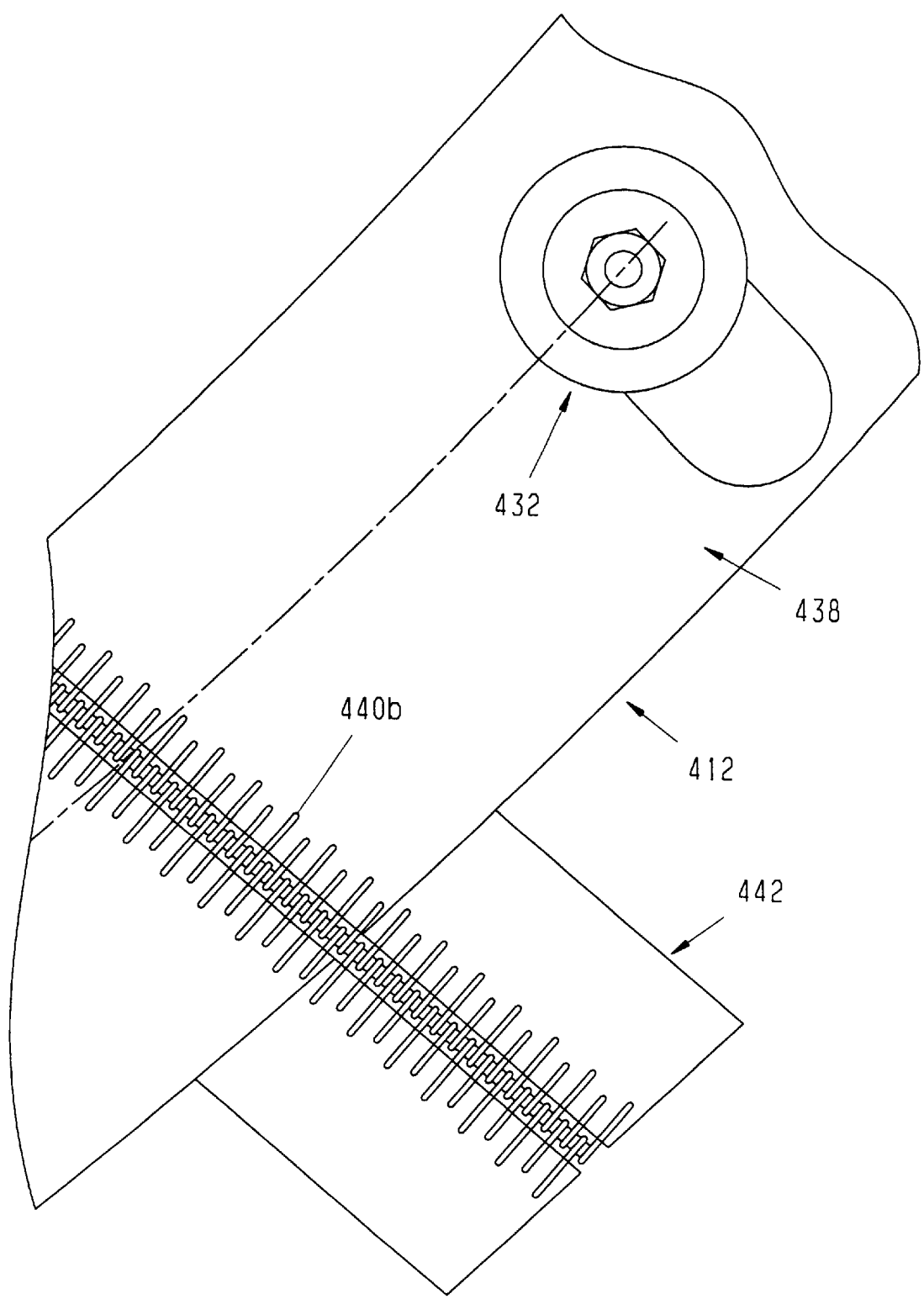
FIG. 15 is an enlarged view of a fragment of the belt of FIG. 14 illustrating a lacing jig used to assist in lacing the belt segments.

Lacing clips 440b are optionally aligned along the radii of belt 412 and are placed on belt 412 by a lacing machine. In order to ease alignment of belt 412 in the lacing machine, a lacing jig 442 is provided (see FIG. 15), which is described in greater detail below. Other methods of aligning the lacing clips may be used, however. For example, belt 412 may be marked, for example, on the back side of belt 412.

In order to place lacing clips 440b on belt 412, lacing jig 442 is initially placed into the comb at one end of the lacing machine. A required number of wire clip fasteners are placed into the comb of a lacing machine next to the jig. The edge of the belt is put into position resting on the comb. The belt is then pushed toward the lacing jig for proper alignment, with the lacing machine actuated, such as by pushing a foot pedal, to crimp the lacing hooks into the belt. The resulting lacing is radially aligned along the belt.

Mounted to the perimeter portion of belt 412 are bearing assemblies 434, such as wheels, rollers, or the like. Bearing assemblies 434 are similarly aligned along the radii of belt 412. In the illustrated embodiment, bearing assemblies 434 are generally aligned along the radii at generally equal lengths so that they are aligned along a radius of curvature of belt 412. However, in order to vary the forces on bearing assemblies 434, for example to more evenly distribute the forces between the respective bearing assemblies, the distance of each respective bearing assembly may be varied. The amount of adjustment, if any, varies depending on the belt material, the size of the belt, the thickness of the belt. In other words, it depends on the stiffness of the belt. The stiffer the belt, the greater the impact of the adjustment. For example, the bearing assemblies nearest the lacing will tend to exhibit greater bearing forces. Optionally, these bearing assemblies may be moved out along their respective radii. For example, these bearing assemblies may be moved a distance in a range of about 0.25 mm to 4 mm, about 0.5 mm to 2 mm, or about 1 mm.

While several forms of the invention have been shown and described, other forms or modifications will now be apparent to those skilled in the art. Belts 12, 112, 212, 412 may be retained on frame 13 using other conventional mechanisms or arrangements, for example by providing the belt with a bead, preferably on the outer perimeter of the belt, which is engaged by fixed bearing assemblies provided on the frame, as would be understood by those skilled in the art. Furthermore, frame 13 may assume other configurations without departing from the scope of the invention. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A belt turn conveyor comprising:
   a frame defining a curved path;
   an endless belt rotationally supported by said frame and extending along said curved path, and said endless belt being restrained in said frame to limit at least one of vertical and lateral movement of the belt with respect to the frame; and
   said endless belt having a curved longitudinal axis and being formed from a belt substrate having a plurality of fibers aligned along said curved longitudinal axis to provide directional strength to said belt along a direction of tension, and said fibers of said endless belt generally oriented to follow said curved path whereby said endless belt exhibits substantially uniform stiffness over its length and exhibits substantially reduced variations in forces where the belt is restrained with respect to the frame.

2. The belt conveyor of claim 1, wherein said outer perimeter of said belt is restrained with respect to said frame.

3. The belt conveyor of claim 2, wherein said outer perimeter includes at least one bearing assembly, said bearing assembly engaging said frame to restrain said belt with respect to said frame.

4. The belt turn conveyor of claim 2, wherein said outer perimeter includes a plurality of bearing assemblies, said bearing assemblies engaging said frame to restrain movement of said belt with respect to said frame.

5. The belt turn conveyor of claim 4, wherein each of said bearing assemblies comprises a wheel assembly.

6. The belt turn conveyor of claim 1, wherein said endless belt comprises a plurality of interconnected belt segments.

7. The belt turn conveyor of claim 6, wherein each of said belt segments is interconnected to an abutting belt segment by one of lacing and finger splicing.

8. The belt turn conveyor of claim 7, wherein each of said belt segments is interconnected to an abutting belt segment by vulcanized finger splicing.

9. The belt turn conveyor of claim 6, wherein each of said segments comprises a segment having an angle in a range of about a 5° to 75°.

10. The belt turn conveyor of claim 6, wherein each of said segments comprises a segment having an angle in a range of about 25° to 30°.

11. A belt turn conveyor comprising:
    a frame defining a curved path and including at least one bearing surface;
    an endless belt rotationally supported by said frame and extending along said curved path, said endless belt having an inner perimeter and an outer perimeter;
    a plurality of spaced bearing assemblies secured to said outer perimeter of said endless belt, said bearing assemblies engaging said bearing surface on said frame and restraining movement of said endless belt on said frame; and
    said endless belt having a curved longitudinal axis and a plurality of fibers generally aligned along said curved longitudinal axis providing directional strength to belt along said curved longitudinal axis whereby said endless belt exhibits substantially uniform stiffness over its length and exhibits substantially reduced variations in forces at said bearing assemblies.

12. The belt turn conveyor according to claim 11, wherein said endless belt comprises a plurality of interconnected belt segments.

13. The belt turn conveyor according to claim 12, wherein said segments are interconnected by one of lacing and finger splicing.

14. The belt turn conveyor of claim 13, wherein each of said segments comprises a segment having an angle in a range of about 5° to 75°.

15. The belt turn conveyor according to claim 14, wherein each of said segments comprises a segment having an angle in a range of about 25° to 30°.

16. The belt turn conveyor according to claim 13, wherein said interconnected segments are joined along an axis offset from a radial axis of said belt turn conveyor to thereby reduce the noise generated by the belt.

17. The belt turn conveyor according to claim 13, wherein each of said segments includes a longitudinal axis and a plurality of longitudinal fibers generally aligned along said longitudinal axis, said fibers of each of said segments generally aligned to follow said curved path.

18. The belt turn conveyor according to claim 17, wherein said fibers of a respective segment are aligned generally parallel to a tangent of a portion of said curved path corresponding to said respective segment.

19. An endless belt assembly for a belt turn conveyor, said belt turn conveyor including a frame having at least one bearing surface and having a curved path, said endless belt assembly comprising:

an endless belt;

at least one bearing assembly secured to said endless belt, said at least one bearing assembly for engaging the bearing surface of said frame to retain said endless belt on said frame; and said endless belt having a curved longitudinal axis for aligning generally coincident with the curved path of said belt turn conveyor and having a curved longitudinal extent, said endless belt including a first plurality of fibers generally aligned along and extending substantially parallel to said curved longitudinal axis of said endless belt and including a second plurality of fibers running generally orthogonal to said first plurality of fibers whereby said endless belt exhibits substantially uniform stiffness over its curved longitudinal extent and exhibits substantially reduced forces at said outer perimeter of said endless belt thereby increasing at least one of the capacity of the endless belt and the longevity of the endless belt.

20. The endless belt assembly according to claim 19, wherein said at least one bearing assembly comprises a plurality of bearing assemblies.

21. The endless belt assembly according to claim 20, wherein said bearing assemblies comprise wheel assemblies.

22. The endless belt assembly according to claim 19, wherein said endless belt comprises a plurality of interconnected belt segments.

23. The endless belt assembly according to claim 22, wherein each of said belt segments includes a longitudinal axis, each of said belt segments having a plurality of fibers being aligned along said longitudinal axis of said belt segment, and each of said belt segments being interconnected with abutting belt segments such that the fibers of each of said belt segments from said longitudinal fibers and generally align along said curved longitudinal axis of said endless belt.

24. The endless belt assembly according to claim 22, wherein each of said belt segments correspond with a portion of said curved longitudinal extent, each of said belt segments including fibers aligned generally parallel to a tangent with said portion of said curved longitudinal extent.

25. The endless belt assembly according to claim 22, wherein each of said segments comprises a segment having an angle in a range of about 5° to 75°.

26. The endless belt assembly according to claim 25, wherein each of said segments comprises a segment having an angle in a range of about 25° to 30°.

27. The endless belt assembly according to claim 22, wherein said belt segments are interconnected by one of lacing and finger splicing.

28. The endless belt assembly according to claim 19, wherein said endless belt includes a plurality of transverse fibers, said transverse fibers being generally aligned along said radial axes of said endless belt.

29. A method of forming a belt turn conveyor belt for a belt turn conveyor having a curved path comprises the step of:

providing a plurality of longitudinal and transverse fibers of a belt material; and generally orienting the longitudinal fibers of the belting material along a curved longitudinal axis to form a curved belt, the curved longitudinal axis at least generally following the curved path of the belt turn conveyor.

30. The method according to claim 29, further comprising aligning the transverse fibers generally orthogonal to said longitudinal fibers.

31. The method according to claim 29, wherein said providing includes providing a plurality of segments of a belting material, each of the segments having the plurality of longitudinal and transverse fibers, and said orienting includes interconnecting the segments and aligning the longitudinal fibers of each segment to substantially follow the curved longitudinal axis.

32. The method according to claim 31, wherein said providing a plurality of segments of the belting material includes providing segments having an angle in a range of 25° to 30°.

33. The method according to claim 31, wherein said interconnecting includes forming joints between the segments, and off setting the joints from radial axes of the curved path whereby the belt generates reduced noise.

34. The method according to claim 29, wherein orienting includes weaving the longitudinal and transverse fibers to form the curved belt.

35. The method according to claim 34, further comprising applying a polymeric cover to each side of the belt material.

36. The method according to claim 35, wherein applying includes rolling a polymeric cover to each side of the belt material.

* * * * *